Nov. 17, 1959     R. E. CHEROUVRIER     2,912,900
APPARATUS FOR VIEWING OR READING MICROFILMS
Filed April 2, 1957     4 Sheets-Sheet 1
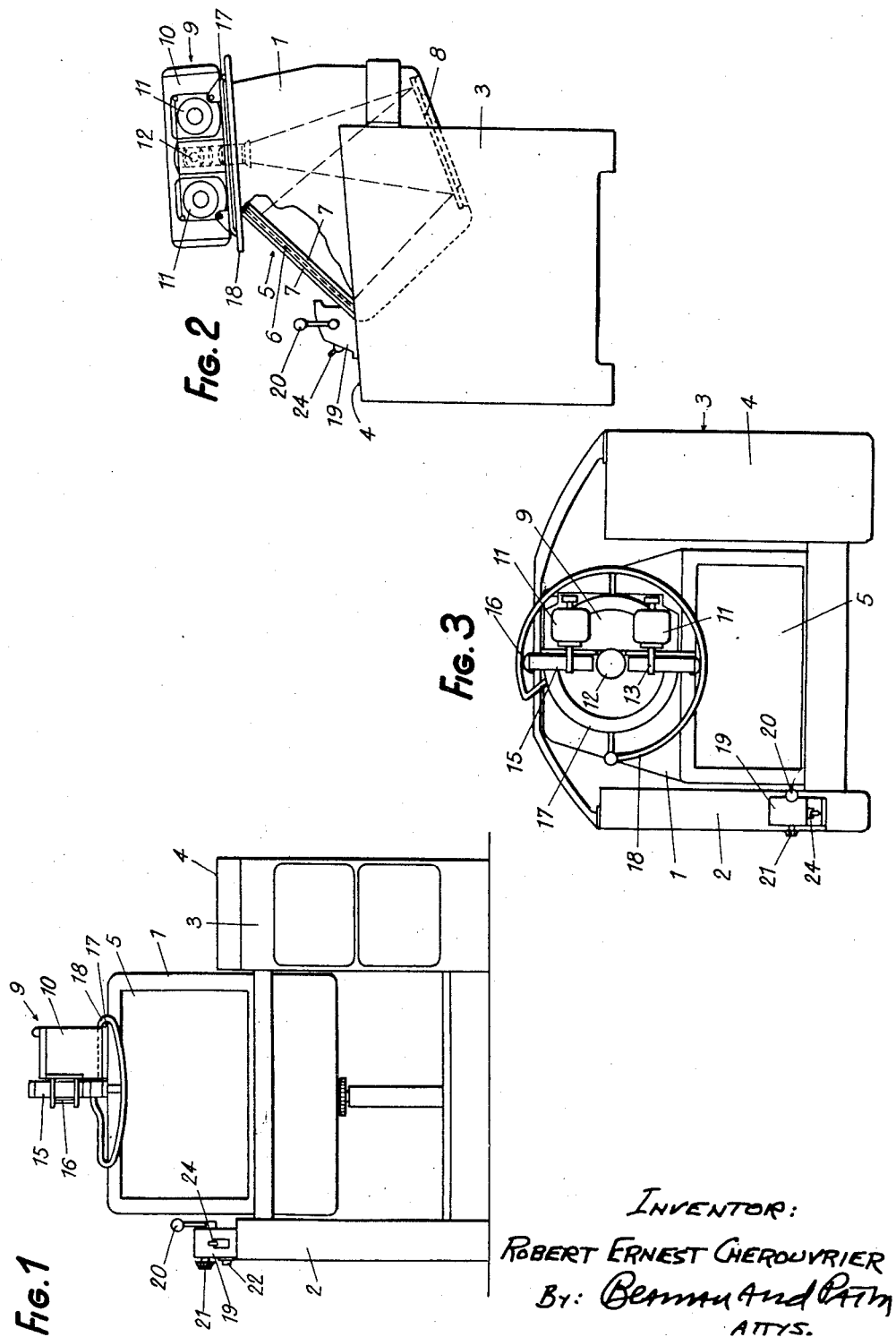
INVENTOR:
ROBERT ERNEST CHEROUVRIER
By: Beaman and Path
ATTYS.

Nov. 17, 1959  R. E. CHEROUVRIER  2,912,900
APPARATUS FOR VIEWING OR READING MICROFILMS
Filed April 2, 1957  4 Sheets-Sheet 2
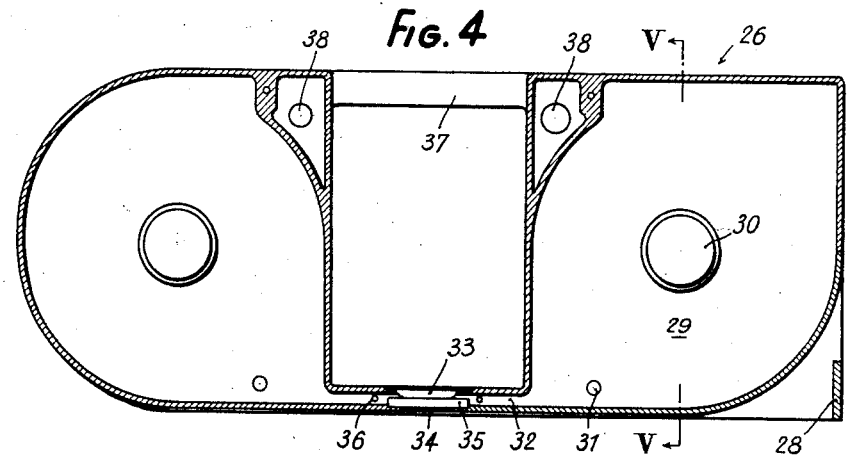
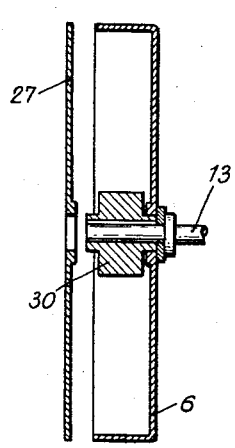
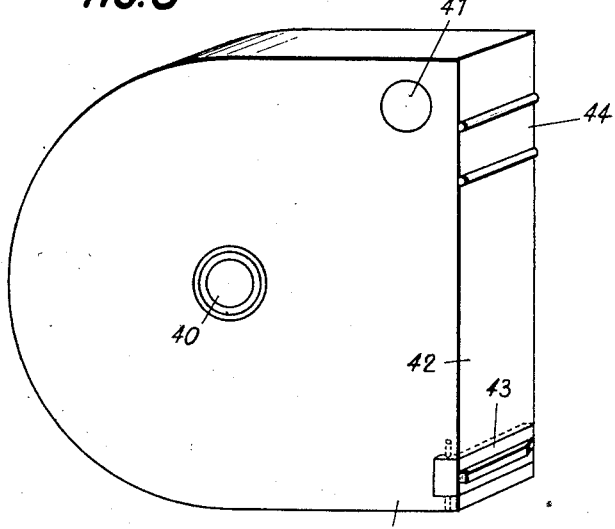
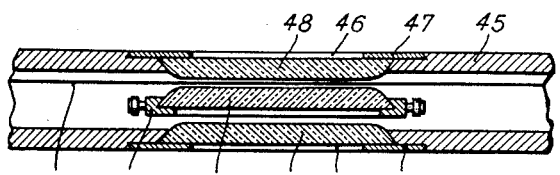
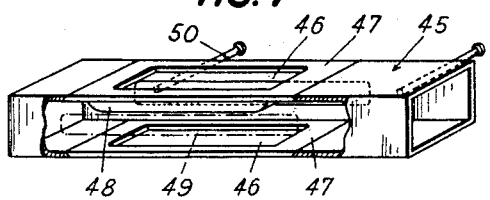

Nov. 17, 1959   R. E. CHEROUVRIER   2,912,900
APPARATUS FOR VIEWING OR READING MICROFILMS
Filed April 2, 1957   4 Sheets-Sheet 3

INVENTOR:
ROBERT ERNEST CHEROUVRIER
BY: Bermy and Patry
ATTYS.

Nov. 17, 1959 R. E. CHEROUVRIER 2,912,900
APPARATUS FOR VIEWING OR READING MICROFILMS
Filed April 2, 1957 4 Sheets-Sheet 4
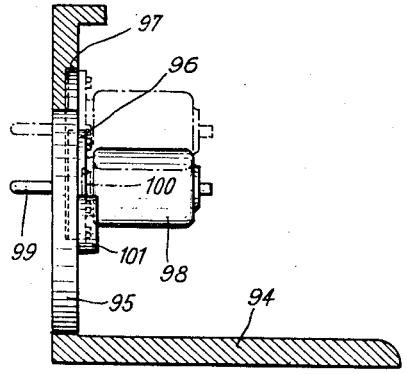
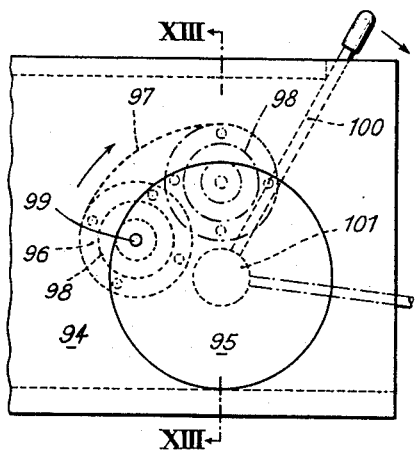
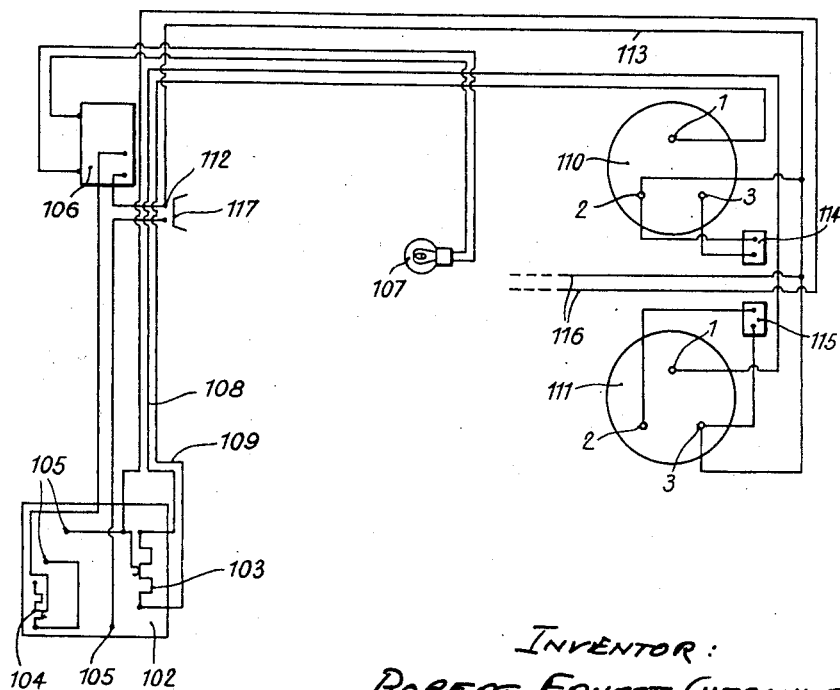
INVENTOR:
ROBERT ERNEST CHEROUVRIER
BY: Berman and Patti
ATTYS.

United States Patent Office 2,912,900
Patented Nov. 17, 1959

2,912,900

APPARATUS FOR VIEWING OR READING MICROFILMS

Robert Ernest Cherouvrier, Paris, France

Application April 2, 1957, Serial No. 650,226

Claims priority, application France October 17, 1956

1 Claim. (Cl. 88—24)

The present invention relates generally to apparatuses for viewing or reading microfilms and has more particular reference to a new or improved apparatus of this category permitting microfilms of considerable length to be easily and clearly viewed and read.

An object of the invention is to provide a relatively simple and sturdy apparatus of this category permitting a microfilm of considerable length to be projected for viewing or reading purposes on a display or exhibition screen.

Another object of the invention is to provide a microfilm viewing and reading apparatus which is both easy to control or manipulate and silent in operation, the movable elements of said apparatus being driven by adjustable electric devices for causing the microfilm to pass off according to requirements in front of an optical head which projects its images upon the display screen.

Still another object of the invention is to provide a microfilm viewing and reading apparatus including an optical head associated with a reversible control system forming a carrier unit capable of removably housing magazines containing the microfilms to be viewed, whereby a simple frictional engagement of said magazines upon said carrier unit ensures a power drive between the reversible control system and the microfilm reels, thereby causing the microfilm properly to pass off in front of the optical head and its images to be projected upon the screen or other reading off surface.

A further object of the invention is to provide a microfilm viewing or reading apparatus forming a cabinet-like assembly including a box or housing carried by supporting legs, the several control members being accommodated in suitable portions of said cabinet for being hidden off sight while being sheltered from dust and possible damage due to careless handling, the front face of the box or housing forming a viewing or reading screen on which the image of the microfilm projected upon said screen by the optical head appears.

A still further object of the invention is to provide a microfilm-holding magazine adaptable upon a viewing or reading apparatus, constituted by a box in which the microfilm is preserved from dust and other sources of damage, said magazine being capable of being for example stowed away on the shelves of a bookcase, mere engagement thereof upon the head of the apparatus permitting the travel of the microfilm from one reel to another and its passing in front of an optical head to be so controlled as to cause its images to be projected upon a viewing or reading screen.

Yet another object of the invention is to provide an apparatus of this category including a projecting device fitted with an optical head and a reversible driving system housed in a suitable casing and associated with suitable control members by which the film is properly illuminated by the optical head for performing projection and driving of the microfilm in the one or the other direction at the required speed, a magazine containing the microfilm being removably adaptable upon said projecting device, whereby the microfilm may be caused to travel in front of the optical head through a gate member provided in or on the projecting device.

And a still further object of the invention is to provide a microfilm viewing or reading apparatus including means for keeping proper flatness of the film while it is held motionless for preserving adequate definition of the image even if the film does not pass right in front of the optical head, said means being adapted to clamp the film between a pair of film-pressing elements for staving off any warping effect even under the effect of the heat evolved by the lamp of the projecting device.

With these and such other objects in view as will incidentally appear hereafter, the invention comprises the novel construction, combination and arrangement of parts that will now be described with reference to the accompanying drawings illustrating the same and forming a part of the present disclosure.

In the drawings:

Fig. 1 is a front view of the entire apparatus shown diagrammatically.

Fig. 2 is a corresponding edge view with parts broken away for the sake of clearer illustration.

Fig. 3 is a corresponding plan view with parts broken away for the same purpose.

Fig. 4 is a longitudinal sectional view showing on a larger scale a double magazine.

Fig. 5 is a corresponding transverse sectional view on the line V—V of Fig. 4.

Fig. 6 is a perspective view of a single magazine.

Fig. 7 is a perspective view drawn on a larger scale, with parts broken away, showing an independent removable gate member.

Fig. 8 is a sectional detail view.

Fig. 12 is a fragmentary front view of a carrier and adjustable motors.

Fig. 13 is a transverse sectional view on the line XIII—XIII of Fig. 12.

Fig. 14 is a diagrammatic illustration of the electrical wiring of the apparatus.

Figure 9:
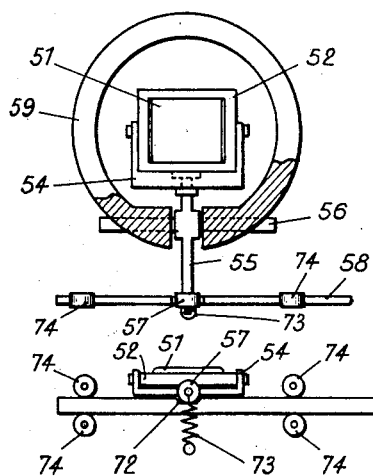
Fig. 9 is a fragmentary top plan view showing a portion of the film-pressing device.

As shown, the apparatus comprises a box or housing 1 so supported by upstanding legs 2, 3 as to form a cabinet like assembly. The leg 2 contains the control members to be described hereafter, while the leg 3 which is wider may be hollow and may form shelves on which microfilm magazines may be for example laid. The leg 3 may be covered by a bracket table 4 upon which the operator may lean for writing down notes.

The apparatus box 1 is defined forwardly by a viewing and projecting screen 5. In order to improve the quality of the image as obtained and to eliminate shady zones which would interfere with the production of a uniformly illuminated image, the screen is advantageously constituted by a sheet of paper, plastic material or similar translucent substance which is preferably held between a pair of glass or like plates which stave off any risk of damage such as bruising or scratching. In the showing of Fig. 2, 6 designates a sheet of translucent paper held by a pair of glass plates 7.

As also visible in Fig. 2, the lower rear portion of the box 1 is occupied by a plane mirror 8 which reflects the microfilm images upon the viewing or reading screen 5 as received by a projecting device designated in its entirety by 9.

The projecting device comprises a casing 10 in which are housed two asynchronous motors 11 of the hereafter described type. An optical head 12 is arranged between the two motors 11. Said optical head may be of any approved type and is not described here because technicians skilled in the art are well aware of its conventional construction. The optical head 11 is advantageously provided with a low voltage electric light source having a pin-point filament, a reflector, a condenser and a projecting objective. A gap is left between the condenser and the objective for allowing the microfilm to pass therethrough as indicated hereafter. As shown by the plan view which forms Fig. 3, the shafts 13 of the motors 11 are engaged through a carrier 14 (see also Figs. 12 and 13). Owing to this arrangement, the motor shafts 13 protrude forwardly with respect to the projecting device 9 for receiving the cores of a microfilm magazine 15 which is removably held upon the projecting device by means of an elastic yoke member 16.

The entire projecting device 9 is mounted (as shown) upon a ring member 17 which rests upon a circular rail, thereby permitting said device to be revolved about the optical axis of the head 12. A control wheel 18 is fixed outwardly to the ring member 17 for facilitating control of said angular motion. The latter is preferably limited to an extent of 90° by stops (not shown) which permits projections offset by 90° to be obtained upon the screen 5. Therefore a microfilm may be read off either widthwise or lengthwise.

To the left of the box 1 is provided a control desk 19 which permits the passing of the microfilm in front of the optical head 12 in the proper direction and at a suitable speed to be performed. The control desk 19 includes a hand lever 20 for controlling the unreeling of the film, thereby permitting the speed and direction of the travelling path of the film to be suitably regulated. A knob 21 is provided for controlling the intensity of the illumination, while another knob 23 permits the motors 11 to be switched on or off. There is also provided a master switch 24.

The double magazine 26 shown in Figs. 4 and 5 has a generally parallelepipedic shape, which permits it to be stowed upon the shelves of a bookcase, its disengagement being facilitated by a transverse front bar 28. Said magazine includes a box defining a pair of chambers 29 in which are arranged for rotary motion cores 30 driven by the motors 11 the shafts 13 of which are visible in Fig. 5. Such cores receive the film. One of them is the receiving core, while the other one behaves as a let off core. The film travels under rollers 31 and through a gate member 32 which interconnects the two chambers 29. The gate member 32 is closed on its top face by a stationary glass pane 33 and on its lower face by a thin glass pane 30 which precludes any penetration of dust. Transverse slots 35 are provided in the gate member 32 to enable the movable glass pane of the film-pressing element, as set forth hereafter, to pass therethrough. A pair of resiliently mounted small rollers 36 hold in motionless condition the film applied against the lower face of the upper glass pane 33, thereby permitting the magazine to be properly set into position and the movable glass pane to be inserted without any risk of the film becoming damaged e.g. bruised or scratched. The two chambers 29 are separated by a gap which receives the optical head 12 of the apparatus; they are bridged at their upper bends by small bars 37. Differently sized bores 38 are provided in thickened portions of the box wall for receiving shafts having different diameters supported by the carrier 14 which holds down the motors 11 and the optical head 12, thereby avoiding any mistake when it is desired to fit the magazine into proper position. The magazine box is closed by a lid 27.

It will be seen from the foregoing that the magazine is entirely closed, thereby avoiding any direct manipulation of the film and consequently any risk of the same being marred by pollution or otherwise damaged. Proper positioning of the magazine is performed by engaging the same upon the shafts 13 of the motors 11 and the corresponding shafts of the carrier 14. A magazine of the double type as above described is suitable for example for films of medium length, say 180 meters. However such a magazine having a pair of chambers interconnected by a gate member might reach an undue size in the case of films of larger length such for instance of 300 meters. In such an event, magazines only containing one chamber or film reel should be used by preference, thereby substantially lessening their length. A simple magazine of this type is shown as viewed from the outside in 39 on Fig. 6. There is shown at 40 the end of the film-receiving core and at 41 the magazine-positioning bore. As hereinbefore set forth, this scheme permits magazines containing a longer film to be used in the apparatus without giving the magazine an unduly large size. The front edge 42 of the magazine 39 is provided adjacent its lower end with a slot which is normally shrouded by a pivotal flap or shutter 43 which keeps dust outside the magazine. Such slot serves for the egress of the film. The top part of said edge 42 is formed with a guide 44 upon which an identifying label may be affixed.

A pair of magazines of the type shown on Fig. 6 may be arranged for cooperation with a stationary gate member fixed to the apparatus or alternatively with a removable gate member of the type shown in Fig. 7. One of the magazines might also carry a gate member.

The removable gate member 45 (Fig. 7) comprises a hollow guide having a rectangular cross section and open at both ends. It is provided in its upper and lower walls with apertures 46 defined by masks (Figs. 7 and 8) held in dovetail-shaped grooves in the gate member, while glass panes 48 applied against the inner faces of said masks are held down in position by other dovetail-shaped grooves. The independent removable gate member 45 is formed in its narrow longitudinal sides with slots 41 through which the movable glass pane of the film-pressing element passes and is moreover provided for being suitably mounted with pins 50 protruding from its narrow longitudinal surfaces and engageable into associated holes formed in the carrier 14.

As clearly visible in Fig. 8, the movable glass pane 51 of the film presser which is set into a frame 52 is interposed between the two panes 48 of the gate member 45, the film F passing between the movable pane 51 and the top pane 48.

When it is desired to use the apparatus, it is only sufficient as will be readily understood from the foregoing to adapt upon the carrier for the projecting device 9 the magazine or magazines containing the microfilm which has to be projected upon the screen 5. Proper driving relation is automatically performed between the shafts 13 of the motors 11 and the magazine cores 30 so that viewing or reading of the microfilm may be started at once by moving the same from the control desk 19. It will be seen that the use of the apparatus merely requires a minimum number of manipulations.

Figure 10:
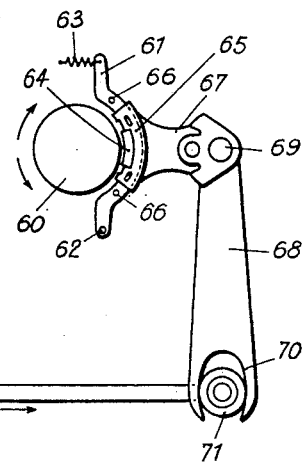
Fig. 10 is a diagrammatic illustration of a control device for the film-pressing glass pane.

In the showing of Figs. 9 and 10 is diagrammatically illustrated a device permitting the microfilm to be automatically pressed when the motors are inoperative so that heating of that portion of the film which is stopped in front of the light source of the optical head 12 cannot warp or distort the film to such an extent as would interfere with proper definition of the images projected on the screen 5. As indicated in the foregoing, the microfilm passes through the gap provided between the condenser and the objective of the optical head 12, the glass panes which form the film presser being also arranged in that gate member as shown by Fig. 8.

In the showing of Figs. 9 and 10 there is indicated at 51 the film presser glass pane also visible in Fig. 8, and at 52 the frame in which said pane is set. This frame is pivotally supported by pins 53 in a yoke member 54 supported by a lever 55 mounted at one end for pivotal motion about a stationary pin 56 and having its other end, which carries a roller 57, engaged by a control rod 58 as described hereafter. In Fig. 9 the reference 59 designates the objective holder in the central portion of which the film presser glass pane 51 is mounted.

In the showing of Fig. 10 there is indicated at 60 a drum member fixed upon the shaft of one of the motors 11 of the projection control device. A drum member of this type may be provided upon the shafts of both motors 11 by associating therewith a brake similar to the one described hereafter for ensuring a more uniform unreeling of the film while precluding any overriding. The brake illustrated in this constructional form comprises a lever 61 pivotally supported by a pin 62 and elastically urged toward the drum member 60 by a spring 63. The braking shoe 64 is carried by a slide 65 movable between a pair of stops 66 on the lever 61. The slide 65 is carried by a fork member 67 which engages a cranked lever 68 pivotally carried about a pin 69 whereby a motion of the slide 65 on the lever 61 rocks the cranked lever 68 about its axis 69. The longer arm of the cranked lever 68 engages through a fork member 70 a roller 71 carried by the control rod 58 thereby imparting a translational movement to said rod. The rod 58 is provided adjacent its opposite end with a double ramp 72 on which is engaged the roller 57 which is urged by a spring 73, the tendency of which is elastically to urge the roller 57 toward the bottom of the notch defined by the ramps 72, thereby applying the glass pane 51 of the film presser against the associated glass pane 48 (Fig. 8) for so clamping the film as to maintain it adequately flat, thereby avoiding the projected image from being blurred. This arrangement of the glass panes of the film presser 51 and 48 is thus automatically ensured when the motors 11 are at a standstill. However as the film is moved, the control rod 58 receives a translational motion as indicated in the foregoing, so that the roller 57 rides up along one of the ramps 72 and the glass pane 51 is moved off the stationary glass pane 48, thereby avoiding scratching of the film. The control rod 58 is guided for permitting proper translational movement thereof between sets of rollers 74.

Figure 11:
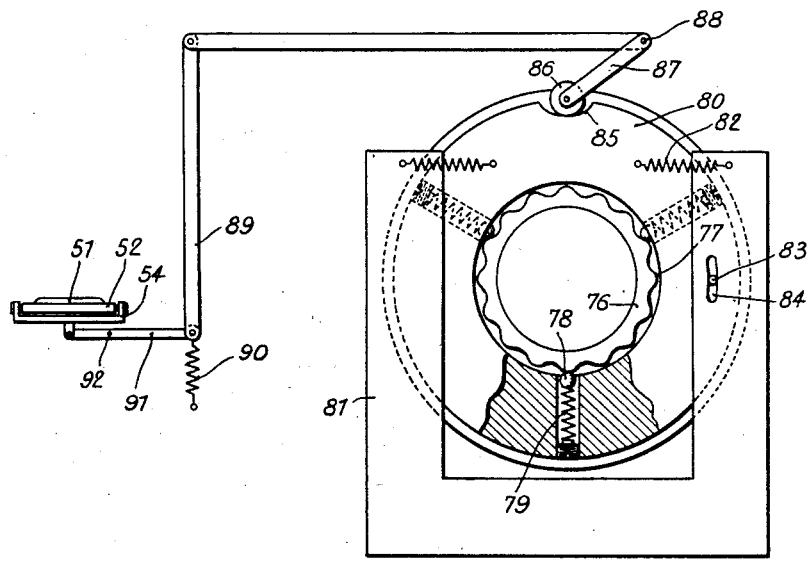
Fig. 11 is a diagrammatic view showing a modification of the control device for the film-pressing glass pane.

In the diagrammatic showing of Fig. 11 is illustrated another device for the automatic control of the film presser of the apparatus when the motors 11 are at a standstill. A ring member 76 is rigidly connected to one of the motor shafts. Such ring member is formed on its periphery with teeth 77 of curved shape, against which are readily applied balls 78 urged by springs 79 and capable of being retracted into a platen 80 mounted for rotation independently of the ring member 76 between a pair of plates 81. The platen 80 is elastically urged back to a position of equilibrium by springs 82 and has its angular motion limited by a stud 83 movable through an arcuate slot 84 in a plate. The platen 80 is provided at one point of its periphery with oppositely directed ramps 85 which are slightly spaced from each other and defining a gap through which a roller 86 carried by a cranked lever 87 pivotally supported at 88 is movable. The lever 87 engages a link 89 urged by a return spring 90 and is hinged to a lever 91 pivotally supported at 92 and adapted to control the motion of the yoke member 54 in which the frame 52 of the movable glass pane 51 of the film is fitted.

While the shafts of the motors are rotating, the ring member 76 tends to drive the platen 80. However the balls 78 are elastically moved off when the platen 80 reaches the end of its stroke, whereupon the roller 86 rides up along one of the ramps 85 and the movable glass pane of the film presser is shifted downwardly. When the motors are brought to a standstill, the platen 80 is no longer angularly urged by the member 76 and is then elastically returned to the middle position as shown. The roller 86 falls back to the bottom of the notch defined by the ramps 85 and the movable glass pane of the film presser is elastically urged upwardly by the spring 90 and thus applied against the associated stationary pane 48.

In the showing of Figs. 12 and 13 is illustrated a method of mounting the members as aforesaid whereby the distance between the shafts of the motors and the position of the motors heightwise may be so varied as to permit magazines of different dimensions to be adapted to the apparatus.

The carrier for the motors is constituted in this constructional form by an angle member 94 the illustrated portion of which has a port of large diameter for receiving a revoluble plate 95 supported in any conventional manner. The plate 95 is provided at a suitable position of its periphery with a semi-circular boss 96 adapted, when an angular motion takes place, to slide through a groove 97 in the angle member 94 and to abut the edges of said groove when the plate 95 assumes its end angular positions. The motor 98 is supported by its flange 95 and its boss 96 (as shown) and has its axis 99 engaged through the plate for driving the cores of the magazine or magazines. A control lever 100 is fixed to a hub portion 101 of the plate 95. It will be seen from an examination of Figs. 12 and 13 that owing to this arrangement the motor can be brought to two or more positions. A similar mounting scheme is provided for the other motor comprised in the apparatus, whereby the distance between the motor shafts and the position of said shafts heightwise over the base limb of the angle member 94 can be varied to suit the diameter of the magazines adaptable to the apparatus.

In the showing of Fig. 14 is illustrated the electrical wiring that serves the apparatus and enables it properly to operate. The control desk 102 carries a rheostat or potentiometer 103 for the control of the motors, also a potentiometer 104 for controlling the intensity of the illumination and terminals 105 for connection to the electric network. 106 designates a transformer that feeds the pin-point filament lamp 107 of the apparatus by supplying the same with low voltage current when the switch 117 is moved to the "on" position. As illustrated, the ends of the resistor embodied in the rheostat 103 are connected by leads 108, 109 to the terminals "1" of the two motors 110, 111. These motors are of the one-phase induction type and have their armatures short circuited. The terminal 112 is connected by a lead 113 to the terminals "2" and "3" of the motors between which are interposed capacitors 114, 115. It will be noticed that the terminals "2" and "3" of the two motors are reversely fed for the two motors which, owing to this, revolve in opposite directions. The leads 116 may feed an electromagnet for electrically controlling the film presser. The differential feed obtained for the windings of the two motors 110, 111 at the ends of the potentiometer 103 permits, responsive to the position of the runner of said potentiometer 103, the film to be driven in the one or the other direction, one of the motors then rotating in a direction opposite to its normal direction of rotation every time the switch 117 is in closed position. The balance between the two motors thus permits the film to be temporarily held motionless. It will be understood that control is of a progressive nature and any driving speed in the one or the other direction may be obtained owing to an extremely simple arrangement without requiring any transmitting mechanism or gear since the motor shafts directly drive the cores of the film magazines.

Minor constructional details may be varied within the field of technical equivalencies. Thus for example the displacement of the movable glass pane of the film presser may be performed by an electro-magnet which may be energized or deenergized when the motor is rendered inoperative. Furthermore, the apparatus might embody a removable frame associated for instance to the optical head for viewing or reading microcards instead of microfilms.

What is claimed is:

An apparatus for viewing and reading microfilms comprising a housing, a reading surface on said housing, a projecting optical head fitted upon said housing, a removable film magazine having two closed chambers arranged on the opposite sides of the optical head, a guiding gate member for the microfilm rigid with said chambers, ports provided in said gate member and a fixed glass pane mounted in said member coincident with said ports, a movable glass pane mounted in said housing opposite said fixed pane, said film being guided between said panes, means for moving said movable glass pane for clamping the microfilm when the latter is stationary, a carrier provided on said housing, said carrier having a pair of apertures, plates rotatable across said apertures of the carrier, electric motors fixed eccentrically upon said plates, the shafts of said motors extending through said plates, hubs in said magazine chambers, said hubs being removably engaged upon said shafts, and means for controlling the angular motion of said plates for varying the distance between the motor shafts and the position of said shafts whereby magazines of different sizes may be employed with said apparatus.

References Cited in the file of this patent

UNITED STATES PATENTS

| | | |
|---|---|---|
| 2,130,562 | Pratt | Sept. 20, 1938 |
| 2,369,248 | Pratt | Feb. 13, 1945 |
| 2,487,476 | Pratt | Nov. 8, 1949 |
| 2,624,231 | Kingston | Jan. 6, 1953 |
| 2,630,739 | Strauss | Mar. 10, 1953 |
| 2,659,267 | Baule | Nov. 17, 1953 |
| 2,701,979 | Pratt | Feb. 15, 1955 |
| 2,746,344 | Pratt | May 22, 1956 |
| 2,782,680 | Howell | Feb. 26, 1957 |